US008449981B2

(12) United States Patent
Jung et al.

(10) Patent No.: US 8,449,981 B2
(45) Date of Patent: May 28, 2013

(54) MICROCAPSULES

(75) Inventors: Marc Rudolf Jung, Worms (DE);
Hans-Peter Hentze, Mannheim (DE);
Rainer Dyllick-Brenzinger, Neustadt (DE); Dieter Niederberger, Ludwigshafen (DE); Hans Willax, Maxdorf (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/517,360

(22) PCT Filed: Dec. 10, 2007

(86) PCT No.: PCT/EP2007/063580
§ 371 (c)(1),
(2), (4) Date: Jun. 3, 2009

(87) PCT Pub. No.: WO2008/071649
PCT Pub. Date: Jun. 19, 2008

(65) Prior Publication Data
US 2010/0068525 A1    Mar. 18, 2010

(30) Foreign Application Priority Data
Dec. 13, 2006    (EP) ..................... 06126017

(51) Int. Cl.
*B32B 1/10*    (2006.01)
*B32B 5/16*    (2006.01)
*C08L 29/04*    (2006.01)

(52) U.S. Cl.
USPC ............... 428/407; 428/402.2; 428/402.21; 428/402.22; 524/557; 524/801; 526/73; 526/319

(58) Field of Classification Search
USPC ............. 428/402–402.24; 427/213.3–213.36; 264/4–4.7
See application file for complete search history.

(56) References Cited

U.S. PATENT DOCUMENTS

| 3,043,790 A |   | 7/1962 | Sanders |
|---|---|---|---|
| 3,196,122 A |   | 7/1965 | Evans |
| 3,239,479 A |   | 3/1966 | Roenicke et al. |
| 4,195,110 A |   | 3/1980 | Dierks et al. |
| 4,340,510 A |   | 7/1982 | Howanietz et al. |
| 4,394,411 A |   | 7/1983 | Krull et al. |
| 4,708,924 A |   | 11/1987 | Nagai et al. |
| 4,810,569 A |   | 3/1989 | Lehnert et al. |
| 5,456,852 A |   | 10/1995 | Isiguro |
| 5,596,051 A | * | 1/1997 | Jahns et al. ............... 526/73 |
| 5,955,188 A |   | 9/1999 | Pushaw |
| 6,132,558 A |   | 10/2000 | Dyllick-Brenzinger et al. |
| 7,166,355 B2 |   | 1/2007 | Jahns et al. |
| 7,892,644 B2 |   | 2/2011 | Amrhein et al. |
| 2002/0054964 A1 |   | 5/2002 | Hartmann |
| 2002/0094569 A1 | * | 7/2002 | Yu et al. ................... 435/325 |
| 2002/0135084 A1 |   | 9/2002 | Ohmura et al. |
| 2002/0169233 A1 |   | 11/2002 | Schwantes |
| 2003/0118822 A1 | * | 6/2003 | Jahns et al. ............... 428/402.2 |
| 2004/0110898 A1 |   | 6/2004 | Dreja et al. |
| 2008/0146448 A1 |   | 6/2008 | Dyllick-Brenzinger et al. |
| 2008/0171658 A1 |   | 7/2008 | Dyllick-Brenzinger et al. |
| 2008/0262154 A1 |   | 10/2008 | Behrens et al. |
| 2008/0269394 A1 |   | 10/2008 | Oomura et al. |
| 2008/0293850 A1 |   | 11/2008 | Pakusch et al. |
| 2009/0178773 A1 |   | 7/2009 | Brockmeyer et al. |
| 2009/0256107 A1 |   | 10/2009 | Hentze et al. |

FOREIGN PATENT DOCUMENTS

| CN | 1774489 A | 5/2006 |
|---|---|---|
| DE | 43 17 035 | 11/1994 |
| DE | 43 17 036 | 11/1994 |
| DE | 43 21 205 | 1/1995 |
| DE | 44 19 518 | 12/1995 |
| DE | 44 35 422 | 4/1996 |
| DE | 44 35 423 | 4/1996 |
| DE | 196 23 413 | 12/1997 |
| DE | 0 981 576 | 9/2000 |
| DE | 101 39 171 | 2/2003 |
| EP | 0 333 145 | 9/1989 |
| EP | 0 816 406 | 1/1998 |
| EP | 0 858 478 | 1/2000 |
| EP | 1 029 018 | 9/2001 |
| EP | 1 251 954 | 10/2002 |
| EP | 1 321 182 | 6/2003 |
| GB | 1 505 558 | 3/1978 |
| JP | 3 131533 | 6/1991 |

(Continued)

OTHER PUBLICATIONS

U.S. Appl. No. 12/744,596, filed May 25, 2010, Jung.

(Continued)

*Primary Examiner* — James J Seidleck
*Assistant Examiner* — S. Camilla Pourbohloul
(74) *Attorney, Agent, or Firm* — Oblon, Spivak, McClelland, Maier & Neustadt, L.L.P.

(57) ABSTRACT

The present invention concerns microcapsules comprising a capsule core and a capsule wall, the capsule wall being constructed from 30% to 90% by weight of one or more $C_1$-$C_{24}$-alkyl esters of acrylic and/or methacrylic acid, acrylic acid, methacrylic acid and/or maleic acid (monomers I), 10% to 70% by weight of a mixture of divinyl and polyvinyl monomers (monomers II), the fraction of polyvinyl monomers being in the range from 2% to 90% by weight based on the monomers II, and also 0% to 30% by weight of one or more miscellaneous monomers (monomer III), all based on the total weight of the monomers, a process for their production and their use in textiles, bindered building materials and heat transfer fluids.

20 Claims, No Drawings

FOREIGN PATENT DOCUMENTS

| | | |
|---|---|---|
| JP | 7-144126 | 6/1995 |
| JP | 2006-265363 | 10/2006 |
| WO | 95 34609 | 12/1995 |
| WO | 99 24525 | 5/1999 |
| WO | 02 02222 | 1/2002 |
| WO | 02 20683 | 3/2002 |
| WO | 2005 105291 | 11/2005 |
| WO | 2005 116559 | 12/2005 |
| WO | 2006/092439 A1 | 9/2006 |
| WO | 2008 006762 | 1/2008 |
| WO | 2008 046839 | 4/2008 |

OTHER PUBLICATIONS

U.S. Appl. No. 12/812,325, filed Jul. 9, 2010, Hantze, et al.
U.S. Appl. No. 12/918,728, filed Aug. 20, 2010, Jung, et al.
U.S. Appl. No. 12/281,154, filed Aug. 29, 2008, Dylllick-Brenzinger et al.
U.S. Appl. No. 12/439,928, filed Mar. 4, 2009, Dylllick-Brenzinger et al.
U.S. Appl. No. 12/444,051, filed Apr. 2, 2009, Jung, et al.
U.S. Appl. No. 12/446,592, filed Apr. 22, 2009, Champ, et al.

* cited by examiner

MICROCAPSULES

The present invention concerns microcapsules comprising a capsule core and a capsule wall constructed of $C_1$-$C_{24}$-alkyl esters of acrylic and/or methacrylic acid, acrylic acid, methacrylic acid and/or maleic acid, crosslinkers and also, if appropriate, miscellaneous monomers. The present invention also concerns a process for their production and their use in textiles, bindered building materials and heat transfer fluids.

Textiles combined with latent heat storage media have been studied as a novel combination of materials in recent years. The working principle of latent heat storage media, often also known as phase change materials (PCMs), relies on the transformation enthalpy which arises during the solid/liquid phase transition and which signifies an absorption of energy or release of energy to the environment. They can consequently be used to keep a temperature constant within a fixed temperature range.

EP-A 1 029 018 teaches the use of microcapsules having a capsule wall of a highly crosslinked methacrylic ester polymer and a latent heat storage core in bindered building materials such as concrete or gypsum. DE-A 101 39 171 describes the use of microencapsulated latent heat storage materials in gypsum plasterboards. Furthermore, WO 2005/116559 teaches the use of microencapsulated latent heat storage materials in chipboard panels together with melamine-formaldehyde resins as a binder.

EP-A 1 321 182 teaches microencapsulated latent heat storage materials having a capsule wall of a highly crosslinked methacrylic ester polymer and also nominates their use in textiles. This reference teaches microcapsular dispersions having a particularly low fraction of capsules≦4 μm in particle size.

EP-A 1 251 954 and WO 2005/105291 teach microcapsules based on polymethacrylic acid with or without butanediol diacrylate as a crosslinker. The capsules having particle sizes of 1.2 μm are used for impregnating fibers.

An important criterion for applications as a finish in the textile sector is durability to dry cleaning, i.e., resistance to chlorinated or perchlorinated solvents. There is often a weight loss in the case of conventional microcapsules, indicative of insufficiently tight or defective capsules. Such washout losses can be in the range of 5-15% by weight.

The two prior European applications No. 06117092.4 and No. 06122419.2 propose microcapsules whose surface has been additionally modified with a polyelectrolyte as a way to solve the problem.

As well as a lower washout loss, a low evaporation rate is an important requirement for the capsules, since the capsules are generally processed at high temperatures. While textile applications require an evaporation-rate performance able to cope with challenges posed by comparatively brief thermal loads, good tightness over a long period is required for applications in the building sector.

It is an object of the present invention to provide microcapsules having a low evaporation rate for a wide variety of capsule size distributions.

We have found that this object is achieved by microcapsules comprising a capsule core and a capsule wall, the capsule wall being constructed from 30% to 90% by weight of one or more $C_1$-$C_{24}$-alkyl esters of acrylic and/or methacrylic acid, acrylic acid, methacrylic acid and/or maleic acid (monomers I),
10% to 70% by weight of a mixture of divinyl and polyvinyl monomers (monomers II), the fraction of polyvinyl monomers being in the range from 2% to 90% by weight based on the monomers II, and also
0% to 30% by weight of one or more miscellaneous monomers (monomer III),
all based on the total weight of the monomers, a process for their production and their use in textiles, bindered building materials and heat transfer fluids.

The microcapsules of the present invention comprise a capsule core and a capsule wall. The capsule core consists predominantly, to more than 95% by weight, of lipophilic substance. The average particle size of the capsules (Z-average by light scattering) is in the range from 0.5 to 100 μm, preferably in the range from 1 to 80 μm and particularly in the range from 1 to 50 μm.

In one preferred embodiment, the average particle size of the capsules is in the range from 1.5 to 2.5 μm and preferably in the range from 1.7 to 2.4 μm. And 90% of the particles have a particle size (diameter)≦4 μm, preferably ≦3.5 μm and particularly ≦3 μm. The full width at half maximum value of the microcapsular dispersion is preferably in the range from 0.2 to 1.5 μm and particularly in the range from 0.4 to 1 μm.

In a likewise preferred embodiment, the average particle size of the capsules is >2.5 to 20 μm and preferably in the range from 3.0 to 15 μm.

The weight ratio of capsule core to capsule wall is generally in the range from 50:50 to 95:5. A core/wall ratio in the range from 70:30 to 93:7 is preferred.

The polymers of the capsule wall comprise generally at least 30% by weight, preferably at least 35% by weight and more preferably at least 40% by weight and also generally not more than 90% by weight, preferably not more than 80% by weight and more preferably not more than 75% by weight of $C_1$-$C_{24}$-alkyl esters of acrylic and/or methacrylic acid, acrylic acid, methacrylic acid and/or maleic acid (monomers I) in interpolymerized form, based on the total weight of the monomers.

According to the present invention, the polymers of the capsule wall comprise in general at least 10% by weight, preferably at least 15% by weight and more preferably at least 20% by weight and in general not more than 70% by weight, preferably not more than 60% by weight and more preferably not more than 50% by weight of a mixture of divinyl and polyvinyl monomers (together monomers II) in interpolymerized form, based on the total weight of the monomers. One or more divinyl monomers and also one or more polyvinyl monomers may be interpolymerized.

Monomers II comprises a mixture of divinyl and polyvinyl monomers wherein the fraction of polyvinyl monomers is in the range from 2% to 90% by weight, based on the sum total of divinyl and polyvinyl monomers. The fraction of polyvinyl monomers is preferably in the range from 5% to 80% by weight and more preferably in the range from 10% to 60% by weight, based on the sum total of divinyl and polyvinyl monomers. For microcapsules having an average particle size<2.5 μm, the polyvinyl monomer fraction is preferably in the range from 20% to 80% by weight and particularly in the range from 30% to 60% by weight based on the sum total of divinyl and polyvinyl monomers. For microcapsules having an average particle size≧2.5 μm, the polyvinyl monomer fraction is preferably in the range from 5% to 40% by weight and particularly in the range from 10% to 30% by weight based on the sum total of divinyl and polyvinyl monomers.

In addition, the polymers may comprise up to 30% by weight, preferably up to 20% by weight, particularly up to 10% by weight and more preferably up to 5% by weight and also at least 1% by weight of miscellaneous monomers III, preferably monomers IIIa, in interpolymerized form, based on the total weight of the monomers.

Preferably, the capsule wall is only constructed from monomers of groups I and II.

Suitable monomers I include $C_1$-$C_{24}$-alkyl esters of acrylic and/or methacrylic acid (monomers Ia). They further include the unsaturated $C_3$- and $C_4$-carboxylic acids such as acrylic acid, methacrylic acid and also maleic acid (monomers Ib). Particularly preferred monomers I are methyl acrylate, ethyl acrylate, n-propyl acrylate and n-butyl acrylate and/or the corresponding methacrylates. Preference is given to isopropyl acrylate, isobutyl acrylate, sec-butyl acrylate and tert-butyl acrylate and the corresponding methacrylates. In general, the methacrylates and methacrylic acid are preferred.

In one preferred embodiment, the microcapsule walls are constructed from 25% by weight to 75% by weight of maleic acid and/or acrylic acid particularly methacrylic acid.

Suitable divinyl monomers include divinylbenzene, trivinylbenzene and divinylcyclo-hexane and trivinylcyclohexane. Preferred divinyl monomers are the diesters of diols with acrylic acid or methacrylic acid and also the diallyl and divinyl ethers of these diols. Ethanediol diacrylate, ethylene glycol dimethacrylate, 1,3-butylene glycol dimethacrylate, methallylmethacrylamide, allyl acrylate and allyl methacrylate may be mentioned by way of example. Particular preference is given to propanediol diacrylate, butanediol diacrylate, pentanediol diacrylate and hexanediol diacrylate and the corresponding methacrylates.

Preferred polyvinyl monomers are the polyesters of polyols with acrylic acid and/or methacrylic acid and also the polyallyl and polyvinyl ethers of these polyols. Preference is given to trimethylolpropane triacrylate, trimethylolpropane trimethacrylate, pentaerythritol triallyl ether, pentaerythritol tetraallyl ether, pentaerythritol triacrylate and pentaerythritol tetraacrylate and also their technical grade mixtures.

Preference is given to the combinations of butanediol diacrylate and pentaerythritol tetraacrylate, hexanediol diacrylate and pentaerythritol tetraacrylate, butanediol diacrylate and trimethylolpropane triacrylate, and also hexanediol diacrylate and trimethylolpropane triacrylate.

Monomers III are miscellaneous monomers other than monomers I and II, such as vinyl acetate, vinyl propionate, vinylpyridine and styrene or α-methylstyrene. Particular preference is given to monomers IIIa which bear charge-carrying or ionizable groups and differ from the monomers I and II, such as itaconic acid, maleic anhydride, 2-hydroxyethyl acrylate, 2-hydroxyethyl methacrylate, acrylamido-2-methylpropane-sulfonic acid, methacrylonitrile, acrylonitrile, methacrylamide, N-vinylpyrrolidone, N-methylolacrylamide, N-methylolmethacrylamide, dimethylaminoethyl methacrylate and diethylaminoethyl methacrylate.

The capsule wall is preferably constructed from

30% to 90% by weight of a mixture of monomers Ia and Ib wherein the fraction of monomers Ib is <25% by weight based on the total weight of all monomers I, II and III, 10% to 70% by weight of a mixture of divinyl and polyvinyl monomers (monomers II) wherein the fraction of polyvinyl monomers is 2% to 90% by weight based on the monomers II, and also 0% to 30% by weight of miscellaneous monomers III, all based on the total weight of the monomers.

In a further preferred embodiment, the capsule wall is constructed from

30% to 90% by weight of a mixture of monomers Ia and Ib wherein the fraction of monomers Ib is ≧25% by weight based on the total weight of all monomers I, II and III, 10% to 70% by weight of a mixture of divinyl and polyvinyl monomers (monomers II) wherein the fraction of polyvinyl monomers is 2% to 90% by weight based on the monomers II, and also 0% to 30% by weight of miscellaneous monomers III, all based on the total weight of the monomers.

The microcapsules of the present invention are obtainable via a so-called in situ polymerization. The principle of microcapsule formation is based on a stable oil-in-water emulsion being prepared from the monomers, a free-radical initiator, a protective colloid and the lipophilic substance to be encapsulated. Polymerization of the monomers is then triggered by heating and if appropriate controlled through a further temperature increase, the resulting polymers forming the capsule wall which surrounds the lipophilic substance. This general principle is described for example in DE-A-10 139 171, the content of which is hereby expressly incorporated by reference.

In general, the microcapsules are produced in the presence of at least one organic or inorganic protective colloid. Organic and inorganic protective colloids may be ionic or neutral. Protective colloids can be used not only individually but also in mixtures of a plurality of identically or differently charged protective colloids.

Organic protective colloids are preferably water-soluble polymers which reduce the surface tension of water from a maximum of 73 mN/m to the range from 45 to 70 mN/m and thus ensure the formation of uninterrupted capsule walls and also form micro-capsules having preferred particle sizes in the range from 0.5 to 50 μm, preferably in the range from 0.5 to 30 μm and particularly in the range from 0.5 to 10 m.

Organic neutral protective colloids include for example cellulose derivatives such as hydroxyethylcellulose, methylhydroxyethylcellulose, methylcellulose and carboxy-methylcellulose, polyvinylpyrrolidone, copolymers of vinylpyrrolidone, gelatin, gum arabic, xanthan, casein, polyethylene glycols, polyvinyl alcohol and partially hydrolyzed polyvinyl acetates and also methylhydroxypropylcellulose. Preferred organic neutral protective colloids are polyvinyl alcohol and partially hydrolyzed polyvinyl acetates and also methylhydroxypropylcellulose.

Organic anionic protective colloids include sodium alginate, polymethacrylic acid and its copolymers, the copolymers of sulfoethyl acrylate, of sulfoethyl methacrylate, of sulfopropyl acrylate, of sulfopropyl methacrylate, of N-(sulfoethyl)-maleimide, of 2-acrylamido-2-alkylsulfonic acids, styrenesulfonic acid and also of vinylsulfonic acid. Preferred organically anionic protective colloids are naphthalene-sulfonic acid and naphthalenesulfonic acid-formaldehyde condensates and, in particular, polyacrylic acids and phenolsulfonic acid-formaldehyde condensates.

Pickering systems are an example of useful inorganic protective colloids. Pickering systems facilitate stabilization through very fine solid particles and are insoluble but dispersible in water or are insoluble and nondispersible in water but wettable by the lipophilic substance. Their mode of action and their use is described in EP-A-1 029 018 and also EP-A-1 321 182, both expressly incorporated herein by reference.

A Pickering system in this context can consist of the solid particles on their own or additionally of auxiliary materials which improve the dispersibility of the particles in water or the wettability of the particles by the lipophilic phase.

The inorganic solid particles may be metal salts, such as salts, oxides and hydroxides of calcium, magnesium, iron, zinc, nickel, titanium, aluminum, silicon, barium and manganese. Examples are magnesium hydroxide, magnesium carbonate, magnesium oxide, calcium oxalate, calcium carbonate, barium carbonate, barium sulfate, titanium dioxide, aluminum oxide, aluminum hydroxide and zinc sulfide. Silicates, bentonite, hydroxyapatite and hydrotalcites may likewise be mentioned. Particular preference is given to finely divided silicas, magnesium pyrophosphate and tricalcium phosphate.

The Pickering systems may be introduced, firstly, into the water phase, or be added to the stirred emulsion of oil-in-water. Some fine, solid particles are obtained by a precipitation as described in EP-A 1 029 018 and also EP-A 1 321 182.

Finely divided silicas may be dispersed in water as fine, solid particles. However, it is also possible to use so-called colloidal dispersions of silica in water. Such colloidal dispersions are alkaline, aqueous mixtures of silica. In the alkaline pH range, the particles are swollen and stable in water. For these dispersions to be used as a Pickering system, it is advantageous when the pH of the oil-in-water emulsion is adjusted to pH 2-7 with an acid.

Preference is given to using organic protective colloids if appropriate in admixture with inorganic protective colloids.

In general, the protective colloids are used in amounts of 0.1% to 15% by weight and preferably 0.5% to 10% by weight, based on the water phase. The amounts for inorganic protective colloids preferably range from 0.5% to 15% by weight, based on the water phase. Organic protective colloids are preferably used in amounts of 0.1% to 10% by weight, based on the water phase of the emulsion.

One embodiment has a preference for inorganic protective colloids and their mixtures with organic protective colloids.

A further embodiment has a preference for organically neutral protective colloids. Particular preference is given to OH-bearing protective colloids such as polyvinyl alcohols and partially hydrolyzed polyvinyl acetates.

In general, polyvinyl alcohol and/or partially hydrolyzed polyvinyl acetate are used in a total amount of at least 3% by weight and preferably in the range from 6% to 8% by weight, based on the microcapsules (without protective colloid). It is possible to add further abovementioned protective colloids additionally to the preferred amounts of polyvinyl alcohol or partially hydrolyzed polyvinyl acetate. Preferably, the microcapsules are only produced using polyvinyl alcohol and/or partially hydrolyzed polyvinyl acetate and without inclusion of further protective colloids.

A further embodiment has a preference for mixtures of organic protective colloids such as polyvinyl alcohols together with cellulose derivatives.

Polyvinyl alcohol is obtainable by polymerizing vinyl acetate, if appropriate in the presence of comonomers, and hydrolyzing the polyvinyl acetate to detach the acetyl groups to form hydroxyl groups. The degree of hydrolysis of the polymers can be for example in the range from 1% to 100% and is preferably in the range from 50% to 100% and particularly in the range from 65% to 95%. Partially hydrolyzed polyvinyl acetates herein have a degree of hydrolysis of <50%, while polyvinyl alcohol herein has a degree of hydrolysis of ≧50% to 100%. The synthesis of homo- and copolymers of vinyl acetate and the hydrolysis of these polymers to form polymers comprising vinyl alcohol units is common general knowledge. Polymers comprising vinyl alcohol units are marketed for example as Mowiol® brands by Kuraray Specialities Europe (KSE).

Preference is given to polyvinyl alcohols and/or partially hydrolyzed polyvinyl acetates whose DIN 53015 viscosity at 20° C. in 4% by weight aqueous solution is in the range from 3 to 56 mPa·s and preferably in the range from 14 to 45 mPa·s.

Preference is given to polyvinyl alcohols having a degree of hydrolysis of ≧65%, preferably ≧70% and particularly ≧75%.

The use of polyvinyl alcohol and/or partially hydrolyzed polyvinyl acetate leads to stable emulsions even for small average particle sizes such as 1.5-2.5 μm. The size of the oil droplets is substantially equal to the size of the as-polymerized microcapsules.

The process for producing microcapsules by
a) producing an oil-in-water emulsion comprising the monomers, the lipophilic substance and polyvinyl alcohol and/or partially hydrolyzed polyvinyl acetate, the average size of the oil droplets being 1.5-2.5 μm, and
b) free-radically polymerizing the monomers of the oil-in-water emulsion obtained by a).

Useful free-radical initiators for the free-radical polymerization reaction include the customary peroxo and azo compounds, advantageously in amounts of 0.2% to 5% by weight, based on the weight of the monomers.

Depending on the physical state of the free-radical initiator and its solubility characteristics, the free-radical initiator can be added as such, but is preferably added as a solution, emulsion or suspension because small quantities in particular of free-radical initiator are metered more precisely.

Preferred free-radical initiators are tert-butyl peroxyneodecanoate, tert-amyl peroxypivalate, dilauroyl peroxide, tert-amyl peroxy-2-ethylhexanoate, 2,2'-azobis-(2,4-dimethyl) valeronitrile, 2,2'-azobis(2-methylbutyronitrile), dibenzoyl peroxide, tert-butyl per-2-ethylhexanoate, di-tert-butyl peroxide, tert-butyl hydroperoxide, 2,5-dimethyl-2,5-di(tert-butylperoxy)hexane and cumene hydroperoxide.

Particularly preferred free-radical initiators are di(3,5,5-trimethylhexanoyl) peroxide, 4,4'-azobisisobutyronitrile, tert-butyl perpivalate and dimethyl 2,2-azobisisobutyrate. These have a half-life of 10 hours in a temperature range from 30 to 100° C.

It is further possible to add customary amounts of conventional regulators such as tert-dodecyl mercaptan or ethylhexyl thioglycolate to the polymerization.

The temperature at which the polymerization is carried out is generally in the range from 20 to 100° C. and preferably in the range from 40 to 95° C. Depending on the desired lipophilic substance, the oil-in-water emulsion is to be formed at a temperature at which the core material is liquid/oily. Accordingly, the free-radical initiator chosen has to have its disintegration temperature above this temperature and the polymerization likewise has to be carried out at from 2 to 50° C. above this temperature, so that free-radical initiators whose disintegration temperature is above the melting point of the lipophilic substance are chosen, if appropriate.

A common process variant for lipophilic substances having a melting point of up to about 60° C. is a reaction temperature starting at 60° C., which is raised to 85° C. in the course of the reaction. Advantageous free-radical initiators have a 10 hour half-life in the range from 45 to 65° C. such as t-butyl perpivalate.

In a further process variant for lipophilic substances having a melting point above 60° C., a temperature program which starts at correspondingly higher reaction temperatures is chosen. Free-radical initiators having a 10 hour half-life in the range from 70 to 90° C. are preferred for initial temperatures of around 85° C. such as t-butyl per-2-ethyl-hexanoate.

The polymerization is conveniently carried out at atmospheric pressure, but can also be carried out at reduced or slightly elevated pressure, for example at a polymerization temperature above 100° C., i.e., in the range from 0.5 to 5 bar, say.

The reaction times for the polymerization are normally in the range from 1 to 10 hours and usually in the range from 2 to 5 hours.

A present invention process variant utilizing polyvinyl alcohol and/or partially hydrolyzed polyvinyl acetate makes for an advantageous process method whereby dispersion and polymerization are carried out directly at elevated temperature.

After the actual polymerization reaction at a conversion of 90% to 99% by weight, it is generally advantageous to render the aqueous microcapsular dispersions largely free of odor carriers, such as residual monomers and other organic volatile constituents. This can be achieved in a manner known per se by physical means by distillative removal (in particular by means of steam distillation) or by stripping with an inert gas. It may also be carried out by chemical means, as described in WO 99/24525, advantageously by redox-initiated polymerization, as described in DE-A 44 35 423, DE-A 44 19 518 and DE-A 44 35 422.

The microcapsules of the present invention are useful, depending on the lipophilic substance, for carbonless copy-paper, in cosmetics, for encapsulating adhesives, adhesives components, catalysts or in crop protection or generally for encapsulating biocides. The microcapsules of the present invention are particularly useful for latent heat storage materials.

Latent heat storage materials are by definition substances having a phase transition in the temperature range in which heat transfer is to take place. Preferably, the lipophilic substance has a solid/liquid phase transition in the temperature range from −20 to 120° C.

Examples of suitable substances are:
aliphatic hydrocarbyl compounds such as saturated or unsaturated $C_{10}$-$C_{40}$-hydrocarbons, which are branched or preferably linear, e.g. such as n-tetra-decane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane and cyclic hydrocarbons, e.g. cyclohexane, cyclooctane, cyclodecane;
aromatic hydrocarbyl compounds, such as benzene, naphthalene, biphenyl, o- or n-terphenyl, $C_1$-$C_{40}$-alkyl-substituted aromatic hydrocarbons, such as dodecylbenzene, tetradecylbenzene, hexadecylbenzene, hexylnaphthalene or decylnaphthalene;
saturated or unsaturated $C_6$-$C_{30}$-fatty acids, such as lauric, stearic, oleic or behenic acid, preferably eutectic mixtures of decanoic acid with e.g. myristic, palmitic or lauric acid;
fatty alcohols, such as lauryl, stearyl, oleyl, myristyl, cetyl alcohol, mixtures such as coconut fatty alcohol, and the so-called oxo alcohols which are obtained by hydroformylation of α-olefins and further reactions;
$C_6$-$C_{30}$-fatty amines, such as decylamine, dodecylamine, tetradecylamine or hexadecylamine;
esters such as $C_1$-$C_{10}$-alkyl esters of fatty acids, such as propyl palmitate, methyl stearate or methyl palmitate, and preferably their eutectic mixtures or methyl cinnamate;
natural and synthetic waxes, such as montan acid waxes, montan ester waxes, carnauba wax, polyethylene wax, oxidized waxes, polyvinyl ether wax, ethylene vinyl acetate wax or hard waxes in accordance with Fischer-Tropsch processes;
halogenated hydrocarbons, such as chloroparaffin, bromooctadecane, bromopentadecane, bromononadecane, bromoeicosane, bromodocosane.

Mixtures of these substances are also suitable provided the melting point is not lowered outside of the desired range, or the heat of fusion of the mixture is too low for sensible application.

For example, the use of pure n-alkanes, n-alkanes with a purity greater than 80% or of alkane mixtures as are produced as technical-grade distillate and as such are commercially available is advantageous.

In addition, it may be advantageous to add to the lipophilic substances compounds which are soluble therein in order to prevent the delayed crystallization which sometimes arises with nonpolar substances. As described in U.S. Pat. No. 5,456,852 it is advantageous to use compounds with a melting point at from 20 to 120 K higher than the actual core substance. Suitable compounds are the fatty acids, fatty alcohols, fatty amides and aliphatic hydrocarbyl compounds mentioned above as lipophilic substances. They are added in amounts of from 0.1% to 10% by weight, based on the capsule core.

The latent heat storage materials are chosen according to the temperature range in which the heat storage media are desired. For example, for heat storage media in building materials in a moderate climate, preference is given to using latent heat storage materials whose solid/liquid phase transition is in the temperature range from 0 to 60° C. Thus, for interior applications, individual materials or mixtures with conversion temperatures of from 15 to 30° C. are usually chosen. In the case of solar applications as storage medium or for avoiding the overheating of transparent thermal insulation, as described in EP-A 333 145, conversion temperatures of 30-60° C. are especially suitable. Conversion temperatures of 0 to 40° C. are advantageous for applications in the textile sector in particular and of −10 to 120° C. for heat transfer fluids in particular.

Preferred latent heat storage materials are aliphatic hydrocarbons, particularly preferably those listed above by way of example. Particular preference is given to aliphatic hydrocarbons having 14 to 20 carbon atoms, and mixtures thereof.

In one preferred embodiment, polyelectrolytes are additionally disposed on the outer surface of the capsule wall. Depending on the amount of polyelectrolyte, the polyelectrolyte arrangement on the surface takes the form of points, spots or dots, or takes the form of regions which can extend to where the polyelectrolyte forms a uniform arrangement which resembles a layer, sheath, shell or envelope.

In general, the fraction of polyelectrolytes is in the range from 0.1% to 10% by weight based on the total weight of the polyelectrolyte-bearing microcapsules. Preferably the polyelectrolyte fraction is 0.5%-5% by weight and in particular 1%-3% by weight based on the total weight of the polyelectrolyte-bearing microcapsules.

Different wall thicknesses can be necessary depending on the field of use, so that it can further be sensible to orient the amount of polyelectrolyte on the basis of the total amount of monomers in the wall.

The preferred amount of polyelectrolyte in one embodiment is accordingly in the range from 10% to 30% by weight based on the total amount of the monomers in the wall material.

In another embodiment, the preferred amount of polyelectrolyte is in the range from 5% to 15% by weight based on the total amount of the monomers in the wall material.

The term polyelectrolyte generally refers to polymers having ionizable or ionically dissociable groups which can be a polymer chain constituent or substituent. Typically, the number of these ionizable or ionically dissociable groups in the polyelectrolyte is so large that the polymers are water soluble or swellable in the ionic form (also known as polyions). Preference is given to polyelectrolytes which have a solubility of ≧4 g/l in water at 25° C., in particular polyelectrolytes having unlimited solubility in water. Preference is given to polyelectrolytes that bear an electrolyte functionality on each repeat unit.

Unlike protective colloids, polyelectrolytes generally have little if any emulsifying effect and have predominantly a thickening effect. In the realm of the present invention, polyelectrolytes have an average molecular weight in the range from 500 to 10 000 000 g/mol, preferably in the range from 1000 to 100 000 g/mol and in particular in the range from 1000 to 10 000 g/mol. Linear or branched polyelectrolytes can be used. Unlike the protective colloids used in the realm of the present invention, which are added before the polymerization, to form the oil-in-water emulsion, polyelectrolytes in the realm of the present invention are polymers having ionizable or ionically dissociable groups which are brought into contact with the microcapsules—after polymerization has taken place, that is—in an aqueous medium, preferably water. Aqueous medium refers to aqueous mixtures comprising up to 10% by weight based on the aqueous medium of a water-miscible solvent which is miscible with water at 25° C. and 1 bar in the desired amount. These solvents include alcohols such as methanol, ethanol, propanol, isopropanol, glycol, glycerol and methoxyethanol and water-soluble ethers such as tetrahydrofuran and dioxane and also aprotic additives such as dimethylformamide or dimethyl sulfoxide.

Depending on the identity of the dissociable groups, there are cationic and anionic polyelectrolytes (also known as polyions). The charge on the polyion is considered, without counter-ion. Cationic polyelectrolytes are formed from polymers comprising basic groups (polybases) by addition of protons or quaternization.

Anionic polyelectrolytes are formed from polymers comprising acidic groups (polyacids) by detachment of protons.

The polyelectrolyte is classified according to the resulting net charge of the polyion (i.e., without counter-ion). When the polyelectrolyte has predominantly positively charged, dissociated groups, it is a cationic polyelectrolyte. When it has predominantly negatively charged groups, it is an anionic polyelectrolyte.

Preference is given to using one or more cationic or one or more anionic polyelectrolytes. Particular preference is given to choosing one or more cationic polyelectrolytes. It is believed that successive addition of a plurality of differently charged polyelectrolytes will lead to the construction of a plurality of layers, provided the amount of polyelectrolyte is in each case sufficient to construct a layer. In general, an amount of at least 1% by weight of polyelectrolyte based on the total weight of the polyelectrolyte-bearing microcapsules will lead to coating with a layer. Preferably, however, only one layer of polyelectrolyte is applied. This layer may comprise one polyelectrolyte or a mixture of a plurality of polyelectrolytes having the same charge.

Anionic polyelectrolytes are obtainable for example by free-radical polymerization of ethylenically unsaturated anionic monomers in an aqueous medium. Useful ethylenically unsaturated anionic monomers include for example monoethylenically unsaturated $C_3$- to $C_5$-carboxylic acids such as acrylic acid, methacrylic acid, ethacrylic acid, crotonic acid, maleic acid, fumaric acid and itaconic acid, sulfonic acids such as vinylsulfonic acid, styrenesulfonic acid and acrylamidomethylpropanesulfonic acid and phosphonic acids such as vinylphosphonic acid, and/or the respective alkali metal, alkaline earth metal and/or ammonium salts thereof.

Preferred anionic monomers include acrylic acid, methacrylic acid, maleic acid and acrylamido-2-methylpropanesulfonic acid. Particular preference is given to aqueous dispersions of polymers based on acrylic acid. The anionic monomers can be polymerized either alone, to form homopolymers, or else in admixture with each other, to form copolymers. Examples thereof are the homopolymers of acrylic acid, homopolymers of methacrylic acid or copolymers of acrylic acid and maleic acid, copolymers of acrylic acid and methacrylic acid and also copolymers of methacrylic acid and maleic acid.

However, anionic monomers can also be polymerized in the presence of at least one other ethylenically unsaturated monomer. These monomers can be nonionic or alternatively bear a cationic charge.

Examples of nonionic comonomers are acrylamide, methacrylamide, N—$C_1$- to $C_3$-alkyl-acrylamides, N-vinylformamide, acrylic esters of monohydric alcohols having 1 to 20 carbon atoms such as in particular methyl acrylate, ethyl acrylate, isobutyl acrylate and n-butyl acrylate, methacrylic esters of monohydric alcohols having 1 to 20 carbon atoms for example methyl methacrylate and ethyl methacrylate, and also vinyl acetate and vinyl propionate.

Useful cationic monomers for copolymerization with anionic monomers include dialkyl-aminoethyl acrylates, dialkylaminoethyl methacrylates, dialkylaminopropyl acrylates, dialkylaminopropyl methacrylates, dialkylaminoethylacrylamides, dialkylaminoethyl-methacrylamides, dialkylaminopropylacrylamides, dialkylaminopropylmethacrylamides, diallyldimethylammonium chloride, vinylimidazole, and also cationic monomers each neutralized and/or quaternized with mineral acids. Specific examples of cationic monomers are dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate and diethylaminopropyl methacrylate, dimethylaminoethylacrylamide, dimethylaminoethylmethacrylamide, dimethylaminopropylacrylamide, dimethylaminopropylmethacrylamide, diethylaminoethylacrylamide and diethylaminopropylacrylamide.

Cationic monomers can be completely or else only partially neutralized or quaternized, for example to an extent in each case from 1% to 99%. Dimethyl sulfate is the preferred quaternizing agent for cationic monomers. However, the monomers can also be quaternized with diethyl sulfate or with alkylating agents, in particular alkyl halides such as methyl chloride, ethyl chloride or benzyl chloride. Comonomers for preparing anionic polyelectrolytes are used for example in such amounts that the resulting dispersions of polymer, on diluting with water and at above pH 7.0 and at 20° C., are water soluble and have an anionic charge. Based on total monomers used in the polymerization, the amount of nonionic and/or cationic comonomers is for example in the range from 0% to 99% by weight and preferably in the range from 5% to 75% by weight and is usually in the range from 5% to 25% by weight. Cationic monomers are used at most in an amount such that the resulting polyelectrolytes have a net anionic charge at pH<6.0 and 20° C. The excess anionic charge in the amphoteric polymers formed is for example at least 5 mol %, preferably at least 10 mol %, in particular at least 30 mol % and most preferably at least 50 mol %.

Examples of preferred copolymers are copolymers composed of 25% to 90% by weight acrylic acid and 75% to 10% by weight acrylamide. Preferably, at least one ethylenically unsaturated $C_3$ to $C_5$-carboxylic acid is polymerized in the absence of other monoethylenically unsaturated monomers.

Particular preference is given to homopolymers of acrylic acid which are obtainable by free-radical polymerization of acrylic acid in the absence of other monomers.

Useful crosslinkers for preparing branched polyelectrolytes include all compounds having at least two ethylenically unsaturated double bonds in the molecule. Such compounds are used for example in the preparation of crosslinked polyacrylic acids such as superabsorbent polymers, cf. EP-A 0 858 478 page 4 line 30 to page 5 line 43. Examples of crosslinkers are triallylamine, pentaerythritol triallyl ether, pentaerythritol tetraallyl ether, methylenebisacrylamide, N,N'-divinylethyleneurea, at least diallyl ethers or at least divinyl ethers of polyhydric alcohols such as for example sorbitol, 1,2-ethanediol, 1,4-butanediol, trimethylolpropane, glycerol, diethylene glycol, and of sugars such as sucrose, glucose, mannose, fully acrylated or methacrylated dihydric alcohols having 2 to 4 carbon atoms such as ethylene glycol dimethacrylate, ethylene glycol diacrylate, butanediol dimethacrylate, butanediol diacrylate, diacrylates or dimethacrylates of polyethylene glycols having molecular weights from 300 to 600, ethoxylated trimethylenepropane triacrylates or ethoxylated trimethylenepropane trimethacrylates, 2,2-bis(hydroxymethyl)butanol trimethacrylate, pentaerythritol triacrylate, pentaerythritol tetraacrylate and triallylmethylammonium chloride. When crosslinkers are used in the preparation of the dispersions of the present invention, the amounts of crosslinker which are used in each case are for example from 0.0005% to 5.0% by weight and preferably from 0.001% to 1.0% by weight, based on total monomers used in the polymerization. Preferred crosslinkers are pentaerythritol triallyl ether, pentaerythritol tetraallyl ether, N,N'-divinylethyleneurea, at least diallyl ethers of sugars such as sucrose, glucose or mannose and triallylamine, and also mixtures thereof.

Useful anionic polyelectrolytes further include polycondensates such as for example phenolsulfonic acid resins. Of suitability are aldehyde condensates, particularly on the basis of formaldehyde, acetaldehyde, isobutyraldehyde, propionaldehyde, glutaraldehyde and glyoxal, and very particularly formaldehyde condensates based on phenolsulfonic acids. Amines and amides, in particular those of carbonic acid such as for example urea, melamine or dicyandiamide are examples of further reacting compounds which can be co-used for preparing the phenolsulfonic acid resins.

The phenolsulfonic acid resins are preferably present as salts. The condensation products of the present invention preferably have a degree of condensation in the range from 1 to 20 and an average molecular weight of 500-10 000 g/mol. The phenolsulfonic acid resins are preferably prepared similarly to the way indicated in EP-A 816 406.

Useful cationic polyelectrolytes include for example polymers from the group of the
(a) polymers comprising vinylimidazolium units,
(b) polydiallyldimethylammonium halides,
(c) polymers comprising vinylamine units,
(d) polymers comprising ethyleneimine units,
(e) polymers comprising dialkylaminoalkyl acrylate and/or dialkylaminoalkyl methacrylate units, and
(f) polymers comprising dialkylaminoalkylacrylamide and/or dialkylaminoalkyl-methacrylamide units.

Such polymers are known and commercially available. The monomers underlying the cationic polyelectrolytes of groups (a)-(f) can be used for polymerization in the form of the free base, but preferably in the form of their salts with mineral acids such as hydrochloric acid, sulfuric acid or phosphoric acid and also in quaternized form. Useful quaternizing agents include for example dimethyl sulfate, diethyl sulfate, methyl chloride, ethyl chloride, cetyl chloride or benzyl chloride.

Examples of cationic polyelectrolytes are
(a) homopolymers of vinylimidazolium methosulfate and/or copolymers of vinylimidazolium methosulfate and N-vinylpyrrolidone,
(b) polydiallyldimethylammonium chlorides,
(c) polyvinylamines and also partially hydrolyzed polyvinylformamides,
(d) polyethyleneimines
(e) polydimethylaminoethyl acrylate, polydimethylaminoethyl methacrylate, copolymers of acrylamide and dimethylaminoethyl acrylate and copolymers of acrylamide and dimethylaminoethyl methacrylate, for which the basic monomers can also be present in the form of the salts with mineral acids or in quaternized form, and
(f) polydimethylaminoethylacrylamide, polydimethylaminoethylmethacrylamide and copolymers of acrylamide and dimethylaminoethylacrylamide, for which the cationic monomers can also be present in the form of the salts with mineral acids or in quaternized form.

The average molar masses $M_w$ of the cationic polyelectrolytes are at least 500 g/mol. They are for example in the range from 500 g/mol to 10 million g/mol, preferably in the range from 1000 to 500 000 g/mol and usually in the range from 1000 to 5000 g/mol.

Preference for use as cationic polymers is given to
(a) homopolymers of vinylimidazolium methosulfate and/or copolymers of vinylimidazolium methosulfate and N-vinylpyrrolidone having an average molar mass $M_w$ of 500 to 10 000 g/mol in each case,
(b) polydiallyldimethylammonium chlorides having an average molar mass $M_w$ of 1000 to 10 000 g/mol,
(c) polyvinylamines and partially hydrolyzed polyvinylformamides having an average molar mass $M_w$ of 500 to 10 000 g/mol, and
(d) polyethyleneimines having an average molar mass $M_w$ of 500 to 10 000 g/mol.

The copolymers of vinylimidazolium methosulfate and N-vinylpyrrolidone which are mentioned under (a) comprise, for example, from 10% to 90% by weight of N-vinyl-pyrrolidone incorporated in the form of polymerized units. Instead of N-vinylpyrrolidone, it is possible to use, as a comonomer, at least one compound from the group consisting of the ethylenically unsaturated $C_3$- to $C_5$-carboxylic acids, such as, in particular, acrylic acid or methacrylic acid, or the esters of these carboxylic acids with monohydric alcohols comprising 1 to 18 carbon atoms, such as methyl acrylate, ethyl acrylate, isopropyl acrylate, n-butyl acrylate, isobutyl acrylate, methyl methacrylate, ethyl methacrylate or n-butyl methacrylate.

A preferred polymer of group (b) is polydiallyldimethylammonium chloride. Also suitable are copolymers of diallyldimethylammonium chloride and dimethylaminoethyl acrylate, copolymers of diallyldimethylammonium chloride and dimethylaminoethyl methacrylate, copolymers of diallyldimethylammonium chloride and diethylaminoethyl acrylate, copolymers of diallyldimethylammonium chloride and dimethylaminopropyl acrylate, copolymers of diallyldimethylammonium chloride and dimethylaminoethylacrylamide and copolymers of diallyldimethylammonium chloride and dimethylaminopropyl-acrylamide. The copolymers of diallyldimethylammonium chloride comprise, for example, from 1 to 50, in general from 2 to 30, mol % of at least one of said comonomers incorporated in the form of polymerized units.

Polymers (c) comprising vinylamine units are obtainable by polymerization of N-vinyl-formamide, if appropriate in the presence of comonomers, and hydrolysis of the polyvinylformamides with elimination of formyl groups with formation of amino groups. The degree of hydrolysis of the polymers may be, for example, from 1% to 100% and is preferably in the range from 60% to 100%. In the realm of the present application, partially hydrolyzed polyvinylformamides have a degree of hydrolysis of ≧50% and preferably of ≧90%. The preparation of homo- and copolymers of N-vinylformamide and the hydrolysis of these polymers with formation of polymers comprising vinylamine units are described in detail, for example, in U.S. Pat. No. 6,132,558, column 2, line 36 to column 5, line 25. The statements made there are hereby incorporated by reference in the disclosure of the present invention. Polymers comprising vinylamine units are sold, for example, as Catiofast® and Polymin® brands by BASF Aktiengesellschaft.

Polymers of group (d) which comprise ethyleneimine units, such as polyethylene-imines, are likewise commercial products. They are sold, for example, under the name Polymin® by BASF Aktiengesellschaft, e.g. Polymin® SK. These cationic polymers are polymers of ethyleneimine which are prepared by polymerization of ethyleneimine in an aqueous medium in the presence of small amounts of acids or acid-forming compounds, such as halogenated hydrocarbons, e.g. chloroform, carbon tetrachloride, tetrachloroethane or ethyl chloride, or are condensates of epichlorohydrin and compounds comprising amino groups, such as mono- and polyamines, e.g. dimethylamine, diethylamine, ethylenediamine, diethylenetriamine and triethylenetetramine, or ammonia. They have, for example, molar masses $M_w$, of from 500 to 1 million, preferably from 1000 to 500 000 g/mol.

This group of cationic polymers also includes graft polymers of ethyleneimine on compounds which have a primary or secondary amino group, e.g. polyamidoamines of dicarboxylic acids and polyamines. The polyamidoamines grafted with ethyleneimine can, if appropriate, also be reacted with bifunctional crosslinking agents, for example with epichlorohydrin or bischlorohydrin ethers of polyalkylene glycols.

Suitable cationic polymers of group (e) are polymers comprising dialkylaminoalkyl acrylate and/or dialkylaminoalkyl methacrylate units. These monomers can be used in the form of the free bases but are preferably used in the form of the salts with mineral acids, such as hydrochloric acid, sulfuric acid or phosphoric acid, and in quaternized form in the polymerization. Suitable quaternizing agents are, for example, dimethyl sulfate, diethyl sulfate, methyl chloride, ethyl chloride, cetyl chloride or benzyl chloride. Both homopolymers and copolymers can be prepared from these monomers. Suitable comonomers are, for example, acrylamide, methacrylamide, N-vinylformamide, N-vinylpyrrolidone, methyl acrylate, ethyl acrylate, methyl methacrylate and mixtures of said monomers.

Cationic polymers of group (f) are polymers which comprise dimethylaminoethyl-acrylamide or dimethylaminoethylmethacrylamide units and which comprise the cationic monomers preferably in the form of the salts with mineral acids or in quaternized form. These may be homopolymers and copolymers. Examples are homopolymers of dimethylaminoethylacrylamide which is completely quaternized with dimethyl sulfate or with benzyl chloride, homopolymers of dimethylaminoethyl-methacrylamide which is completely quaternized with dimethyl sulfate, methyl chloride, ethyl chloride or benzyl chloride, and copolymers of acrylamide and dimethylamino-ethylacrylamide quaternized with dimethyl sulfate.

In addition to those polycations which are composed solely of cationic monomers, amphoteric polymers may also be used as cationic polymers, provided that they carry a cationic charge overall. The cationic excess charge in the amphoteric polymers is, for example, at least 5 mol %, preferably at least 10 mol %, and is generally in the range from 15 to 95 mol %. Examples of amphoteric polymers having a cationic excess charge are

- copolymers of acrylamide, dimethylaminoethyl acrylate and acrylic acid which comprise at least 5 mol % more of dimethylaminoethyl acrylate than acrylic acid incorporated in the form of polymerized units,
- copolymers of vinylimidazolium methosulfate, N-vinylpyrrolidone and acrylic acid which comprise at least 5 mol % more of vinylimidazolium methosulfate than acrylic acid incorporated in the form of polymerized units,
- hydrolyzed copolymers of N-vinylformamide and of an ethylenically unsaturated $C_3$- to $C_5$-carboxylic acid, preferably acrylic acid or methacrylic acid, having a content of vinylamine units which is at least 5 mol % higher than units of ethylenically unsaturated carboxylic acids,
- copolymers of vinylimidazole, acrylamide and acrylic acid, the pH being chosen so that at least 5 mol % more vinylimidazole is cationically charged than acrylic acid is incorporated in the form of polymerized units.

Useful polyelectrolytes for the purposes of the present invention further include biopolymers, such as alginic acid, gum arabic, nucleic acids, pectins, proteins, and also chemically modified biopolymers, such as ionic or ionizable polysaccharides, examples being carboxymethylcellulose, chitosan, chitosan sulfate, and ligninsulfonate.

Preference is given to selecting the polyelectrolyte from the group comprising polyacrylic acids, phenolsulfonic acid precondensates, polydiallyldimethylammonium chlorides, polyvinylamines, partially hydrolyzed polyvinylformamides and polyethyleneimine.

One embodiment prefers anionic polyelectrolytes, in particular of polyacrylic acids and phenolsulfonic acid resins.

One embodiment prefers cationic polyelectrolytes, in particular of groups (b), (c) and (d), i.e., polydiallyldimethylammonium chlorides, polyvinylamines and partially hydrolyzed polyvinylformamides and polyethyleneimines. Particular preference is given to using polydiallyldimethylammonium chlorides as cationic polyelectrolytes.

Polyelectrolyte-modified microcapsules are obtained by contacting the microcapsules or preferably a microcapsular dispersion with one or more polyelectrolytes if appropriate in water or in aqueous medium.

Preference is given to polyelectrolyte-modified microcapsules having an average particle size of 1.5-2.5 μm and of which 90% of the particles have the particle size≦4 μm and also to the combination of the preferred embodiments. They are obtained by contacting microcapsules comprising a capsule core and a capsule wall constructed from 30% to 90% by weight of one or more $C_1$-$C_{24}$-alkyl esters of acrylic and/or methacrylic acid, acrylic acid, methacrylic acid and/or maleic acid, preferably of one or more $C_1$-$C_{24}$-alkyl esters of acrylic and/or methacrylic acid (monomers I), 10% to 70% by weight of a mixture of divinyl and polyvinyl monomers (monomers II), the fraction of polyvinyl monomers being in the range from 2% to 90% by weight based on the monomers II, and also 0% to 30% by weight of miscellaneous monomers (monomer III), all based on the total weight of the monomer, the microcapsules having an average particle size of 1.5-2.5 μm and 90% of the particles having a particle size≦4 μm, with one or more polyelectrolytes in water or an aqueous medium. Preferably, a microcapsular dispersion is contacted with one or more polyelectrolytes.

They are preferably obtained by
a) producing an oil-in-water emulsion comprising the monomers, the lipophilic substance and polyvinyl alcohol and/or partially hydrolyzed polyvinyl acetate, the average size of the oil droplets being 1.5-2.5 μm, and
b) free-radically polymerizing the monomers of the oil-in-water emulsion obtained by a) and isolating the microcapsules if appropriate
c) contacting the microcapsules or microcapsular dispersion obtained in b) with one or more polyelectrolytes if appropriate in water or in an aqueous medium.

The polyelectrolyte is added to the starting microcapsular dispersion without a solvent or in solution, preferably as an aqueous solution. The amount of polyelectrolyte is in the range from 0.1% to 5% by weight and preferably in the range from 0.25% to 1.5% by weight, based on the starting microcapsular quantity.

The microcapsules of the present invention can subsequently be isolated by spray drying, if appropriate. The process step of free-radical polymerization b) produces a starting microcapsular dispersion as an intermediate product, which is contacted with the polyelectrolyte in step c). The particle size distribution of the polyelectrolyte-modified microcapsular dispersion is unchanged relative to the starting microcapsular dispersion. Preferably, the microcapsular dispersion obtained from process step b) is contacted with one or more polyelectrolytes, i.e., without intervening isolation of the microcapsules. Since an aqueous dispersion is present in this case, the desired medium in which the microcapsules and the polyelectrolyte can be brought into contact is already at disposal. Contacting or bringing into contact is to be understood as meaning for example mixing with customary stirrers or mixers.

The microcapsules of the present invention can be processed directly as aqueous microcapsular dispersion or in the form of a powder. When used in the textile sector, the microcapsules have good durability to dry cleaning and also good evaporation rates. They also have good fogging values.

The microcapsular powder of the present invention has diverse uses. It is very useful for modifying fibers and textile articles of manufacture, for example textile wovens and nonwovens (batts for example). Useful application forms here include in particular microcapsular coatings, foams with microcapsules and microcapsule-modified textile fibers. For coatings, the microcapsules are applied to a textile article of manufacture together with a polymeric binder and if appropriate other auxiliary materials, generally as a dispersion. Customary textile binders are film-shaping polymers having a glass transition temperature in the range from −45 to 45° C. preferably −30 to 12° C. The production of such microcapsular coatings is described for example in WO 95/34609, expressly incorporated by reference. The modification of foams with microcapsules is effected in a similar manner as described in DE 981576T and U.S. Pat. No. 5,955,188. The prefoamed substrate, preferably a polyurethane or polyether, is surface treated with a binder-containing microcapsular dispersion. The binder-microcapsule mixture is subsequently brought, by application of reduced pressure, into the open-cell foam structure in which the binder cures and binds the microcapsules to the substrate. A further processing possibility is to modify the textile fibers themselves, as by spinning from a melt or an aqueous dispersion as described in US 2002/0054964 for example. Melt spinning processes are employed for nylon fibers, polyester fibers, polypropylene fibers and similar fibers, whereas the wet spinning process is utilized for the production of acrylic fibers in particular.

A further broad field of application is that of bindered building materials comprising mineral, silicatic or polymeric binders. A distinction is made between shaped articles and coating compositions. They are notable for their hydrolytic stability to the aqueous and often alkaline aqueous materials.

The term mineral shaped article refers to a shaped article formed, after shaping, from a mixture of a mineral binder, water, aggregates and also, if appropriate, auxiliaries by the hardening of the mineral binder/water mixture as a function of time, with or without the action of elevated temperature. Mineral binders are common knowledge. They comprise finely divided inorganic substances such as lime, gypsum, clay, loam and/or cement, which are converted to their ready-to-use form by pasting with water and in this form, when left to themselves, undergo consolidation as a function of time to a stonelike mass in air or even under water, with or without the action of elevated temperature.

The aggregates consist in general of granular or fibrous natural or synthetic rock (gravel, sand, glass fibers or mineral fibers) or else, in special cases, of metals or organic aggregates or of mixtures thereof, having grain sizes or fiber lengths in each case adapted to the intended application in a conventional manner. In many cases, chromatic pigments are also used as aggregates for coloring purposes.

Useful auxiliaries include in particular those substances which hasten or delay hardening or which influence the elasticity or porosity of the consolidated mineral shaped article. In particular, they are polymers known for example from U.S. Pat. No. 4,340,510, GB patent 1 505 558, U.S. Pat. No. 3,196,122, U.S. Pat. No. 3,043,790, U.S. Pat. No. 3,239,479, DE-A 43 17 035, DE-A 43 17 036, JP-A 91/131 533 and other references.

The microcapsules of the present invention are suitable for modifying mineral bindered building materials (mortarlike preparations) comprising a mineral binder which consists of from 70% to 100% by weight cement and 0% to 30% by weight gypsum. This holds in particular when cement is the sole mineral binder. The effect of the present invention is essentially independent of the type of cement. Depending on the product at hand, therefore, it is possible to use blast furnace cement, oil shale cement, Portland cement, hydrophobicized Portland cement, quick-setting cement, high-expansion cement or high-alumina cement, the use of Portland cement proving to be particularly favorable. For further details reference may be made to DE-A 196 23 413. Typically, the dry compositions of mineral bindered building materials comprise from 0.1% to 20% by weight of microcapsules, based on the amount of mineral binder.

The microcapsules of the present invention are preferably incorporated in mineral coating compositions such as render. A render of this kind for the interior sector is typically composed of gypsum binder. The weight ratio of gypsum/microcapsule is generally in the range from 95:5 to 70:30. Higher microcapsular fractions are possible of course.

Coatings for the exterior sector such as exterior facings or moist environments may comprise cement (cementiceous renders), lime or waterglass (mineral or silicate renders) or polymeric dispersions (synthetic-resin renders) as a binder together with fillers and, if appropriate, pigments for coloration. The fraction of total solids accounted for by the microcapsules corresponds to the weight ratios for gypsum renders.

The microcapsules of the present invention are further useful in polymeric shaped articles or polymeric coating compositions. By these are meant thermoplastic and thermoset plastics materials whose processing does not entail destruction of the microcapsules. Examples are epoxy, urea, melamine, polyurethane and silicone resins and also coating materials—solventbornes, high solids, powder coatings or waterbornes—and dispersion films. The microcapsular powder is also suitable for incorporation in polymeric foams and fibers. Examples of foams are polyurethane foam, polystyrene foam, latex foam and melamine resin foam.

The microcapsules of the present invention are further useful in lignocellulosic shaped articles such as chipboard.

Advantageous effects can further be achieved if the microcapsules of the present invention are processed in mineral shaped articles which are subjected to foaming.

The microcapsules of the present invention are further useful for modifying gypsum plasterboard. Microcapsular powder is incorporated in an amount which is preferably in the range from 5% to 40% by weight and in particular in the range from 20% to 35% by weight based on the total weight of the gypsum plasterboard (dry matter). The production of gypsum plasterboard comprising microencapsulated latent heat storage media is common knowledge and described in EP-A 1 421 243, expressly incorporated herein by reference. Instead of cellulose-based card it is also possible to use alternative, fibrous structures as both sided covers for the "gypsum plasterboard". Alternative materials are polymeric fibers composed for example of polypropylene, polyester, polyamide, polyacrylates, polyacrylonitrile and the like. Glass fibers are suitable as well. The alternative materials can be employed as wovens and as nonwovens. Such building boards are known for example from U.S. Pat. No. 4,810,569, U.S. Pat. No. 4,195,110 and U.S. Pat. No. 4,394,411.

The microcapsules of the present invention are further useful for producing heat transfer fluid. Heat transfer fluid herein refers not only to fluids for heat transport but also to fluids for cold transport, i.e., cooling fluids. The principle of the transfer of thermal energy is the same in the two cases and only differs in the direction of transfer.

The examples which follow illustrate the invention. The percentages in the examples are by weight unless stated otherwise.

The particle size of the microcapsular powder was determined using a 3600E Malvern Particle Sizer in accordance with a standard method of measurement which is documented in the literature. The D(0.1) value says that 10% of the particles have a particle size (by volume average) up to this value. Correspondingly, D(0.5) means that 50% of the particles have a particle size (by volume average) of not more than this value. The span value is the quotient of the difference (D(0.9)−D(0.1)) and D(0.5).

Determination of Evaporation Rate

By way of pretreatment, 2 g of the microcapsular dispersion were dried in a metal dish at 105° C. for two hours to remove any residual water. Then, the weight ($m_o$) was determined. After one hour of heating at 180° C. and cooling, the weight is redetermined ($m_1$). The weight difference ($m_0$−$m_1$) based on $m_0$ and multiplied by 100 is the evaporation rate in %. The smaller the value, the better the tightness of the microcapsules. It should be borne in mind that comparisons with regard to evaporation rate should always be carried out for comparable capsule sizes and stabilizer systems.

Production of Microcapsular Dispersion

EXAMPLES 1A AND 1B

Capsules Stabilized by Inorganic Pickering Systems

EXAMPLE 1A

Not Inventive

Aqueous Phase
630 g of water
110 g of a 50% colloidal dispersion of $SiO_2$ in water at pH 9.2 (particle size about 80-100 nm)
20.0 g of a 1% by weight aqueous solution of methylhydroxyethylcellulose (Culminal® MHEC 15000 PFR)
2.1 g of a 2.5% by weight aqueous sodium nitrite solution
Oily Phase
431 g of technical grade paraffin cut, $C_{16}$-$C_{18}$ (about 92% $C_{18}$)
9 g of Sasol wax 6805 (high-melting paraffin)
82.5 g of methyl methacrylate (MMA)
27.5 g of butanediol diacrylate ($BDA_2$)
0.76 g of ethylhexyl thioglycolate
0.92 g of a 75% by weight solution of tert-butyl perpivalate in aliphatic hydrocarbons
Addition 1
7.65 g of a 10% by weight aqueous solution of tert-butyl hydroperoxide
Feed Stream 1
28.34 g of a 1.1% by weight aqueous solution of ascorbic acid
a) The aqueous phase was introduced as initial charge and adjusted to pH 2.5 with 20% by weight sulfuric acid. At 40° C., the oily phase was added and the mixture was dispersed with a high-speed dissolver at 3500 rpm for 40 minutes to obtain a stable emulsion.
b) The emulsion, while being stirred with an anchor stirrer, was heated to 67° C. over 60 minutes, heated to 85° C. in the course of a further 60 minutes and maintained at 85° C. for one hour. Addition 1 was added and the resulting microcapsular dispersion was cooled down to 20° C. with stirring in the course of 30 minutes, while feed stream 1 was added over a period of 80 minutes.

This gave a microcapsular dispersion having a solids content of 43.8% by weight and an average particle size of D[4,3]=8.34 µm, span=0.98. The evaporation rate was 70.6%, and the fogging value was 1.3 mg/g.

EXAMPLE 1B

Example 1a was repeated except that 50% by weight of the butanediol diacrylate was replaced by pentaerythritol tetraacrylate (PETIA).

This gave a microcapsular dispersion having a solids content of 39.3% by weight and an average particle size of D[4,3]=5.82 µm, span=1.01. The evaporation rate was 64.6%.

EXAMPLES 2A-2E

Aqueous Phase
380 g of water
190 g of a 5% by weight aqueous dispersion of methylhydroxypropylcellulose (Culminal® MHPC 100)
47.5 g of a 10% by weight aqueous polyvinyl alcohol solution (Mowiol 15-79)
2.1 g of a 2.5% by weight aqueous sodium nitrite solution
Oily Phase 431 g of technical grade octadecane (95% by weight purity)

9 g of Sasol wax 6805 (high-melting paraffin)

19.6 g of methyl methacrylate 19.6 g of crosslinker mixture, see table 1

9.8 g of methacrylic acid 0.7 g of a 75% by weight solution of tert-butyl perpivalate in aliphatic hydrocarbons Addition 1

5.38 g of a 10% by weight aqueous solution of tert-butyl hydroperoxide

Feed Stream 1

28.3 g of a 1.1% by weight aqueous solution of ascorbic acid a) At 40° C., the above aqueous phase was introduced as initial charge and after addition of the oily phase the mixture was dispersed with a high-speed dissolver at 3500 rpm. A stable emulsion was obtained after 40 minutes of dispersion.

b) The emulsion, while being stirred with an anchor stirrer, was heated to 70° C. over 60 minutes, heated to 85° C. in the course of a further 60 minutes and maintained at 85° C. for one hour. Addition 1 was added and the resulting microcapsular dispersion was cooled down to 20° C. with stirring in the course of 30 minutes, while feed stream 1 was added.

The characteristics of the resulting microcapsular dispersions are revealed in table 1. The microcapsules had an average particle size of D[4,3]=3-5 μm.

TABLE 1

Microcapsules from different crosslinker mixtures

| Example | Crosslinker mixture BDA$_2$ [wt %] | PETIA [wt %] | D[4, 3] [μm] | Span | Solids content [%] | Evaporation rate [%] |
|---|---|---|---|---|---|---|
| 2a | 100 | 0 | 4.58 | 1.01 | 44.0 | 11.3 |
| 2b | 95 | 5 | 3.48 | 0.84 | 42.6 | 6.7 |
| 2c | 87.5 | 12.5 | 3.58 | 1.12 | 43.1 | 3.9 |
| 2d | 75 | 25 | 3.76 | 0.91 | 43.4 | 3.9 |
| 2e | 0 | 100 | 3.66 | 0.94 | 43.2 | 30.4 |

BDA$_2$: butanediol diacrylate
PETIA: pentaerythritol tetraacrylate

Examples 2a and 2e are not inventive.

EXAMPLES 3A-3H

Aqueous Phase 425 g of water 412 g of a 10% by weight aqueous polyvinyl alcohol solution (Mowiol 40-88)

2.1 g of a 2.5% by weight aqueous sodium nitrite solution

Oily Phase 431 g of a technical grade paraffin cut, $C_{16}$-$C_{18}$ (about 92% $C_{18}$)

9 g of Sasolwax 6805 (high-melting paraffin)

77.6 g of monomer mixture, as per table 2

0.76 g of ethylhexyl thioglycolate 0.7 g of a 75% by weight solution of tert-butyl perpivalate in aliphatic hydrocarbons Addition 1

5.38 g of a 10% by weight aqueous tert-butyl hydroperoxide solution,

Feed Stream 1

28.3 g of a 1.1% by weight aqueous ascorbic acid solution

Addition 2

1.00 g of a 25% aqueous sodium hydroxide solution 1.43 g of water a) At 70° C., the above aqueous phase was introduced as initial charge and after addition of the oily phase the mixture was dispersed with a high-speed dissolver at 6000 rpm. A stable emulsion of average particle size D[4,3]=2.3 μm diameter was obtained after 40 minutes of dispersion.

b) The emulsion, while being stirred with an anchor stirrer, was heated to 70° C. over 60 minutes, heated to 85° C. in the course of a further 60 minutes and maintained at 85° C. for one hour. Addition 1 was added and the resulting microcapsular dispersion was cooled down to 20° C. with stirring in the course of 30 minutes, while feed stream 1 was added. Addition 2 was added to adjust the pH to 7.

The characteristics of the microcapsular dispersions obtained are described in table 2.

TABLE 2

Evaporation rate from different monomer mixtures (monomer data in % by weight)

| | Example | | | | | | | |
|---|---|---|---|---|---|---|---|---|
| | 3a (comparative) | 3b | 3c | 3d | 3e | 3f | 3g | 3h |
| Monomer mixture | 65% MMA | 65% MMA | 65% MMA | 65% MMA | 65% MMA | 45% MMA | 25% MMA | 5% MMA |
| Monomers Ia | 10% MAS | 10% MAS | 10% MAS | 10% MAS | 10% MAS | 30% MAS | 50% MAS | 70% MAS |
| Monomers Ib | 25% BDA$_2$ | 20% BDA$_2$ | 15% BDA$_2$ | 10% BDA$_2$ | 5% BDA$_2$ | 15% BDA$_2$ | 15% BDA$_2$ | 15% BDA$_2$ |
| Monomers II | 0% PETIA | 5% PETIA | 10% PETIA | 15% PETIA | 20% PETIA | 10% PETIA | 10% PETIA | 10% PETIA |
| Ratio BDA$_2$/PETIA | 100/0 | 80/20 | 60/40 | 40/60 | 20/80 | 60/40 | 60/40 | 60/40 |
| D[4, 3] [μm] | 2.06 | 2.04 | 1.94 | 1.91 | 1.87 | 1.8 | 1.94 | 2.3 |
| Span | 0.35 | 0.35 | 0.34 | 0.35 | 0.30 | 0.25 | 0.35 | 0.3 |
| Solids content [%] | 40.6 | 40.0 | 40.1 | 40.1 | 40.8 | 40.1 | 40.5 | 40.7 |
| Evaporation rate [%] | 22.7 | 7.0 | 6.3 | 8.3 | 9.7 | 2.4 | 7.2 | 2.8 |
| Evaporation rate[1] [%] | 3.6 | 1.8 | 2.2 | 2.0 | 1.9 | 1.2 | 4.4 | 2.1 |

MMA: methyl methacrylate
BDA$_2$: butanediol diacrylate
PETIA: pentaerythritol tetraacrylate
MAS: methacrylic acid

[1] A sample of each of the microcapsular dispersions of Examples 3a-3h was admixed with a 50% by weight aqueous solution of a phenolsulfonic acid-formaldehyde resin ($M_w$ = 7000 g/mol), amount: 1% by weight of resin$_{solid}$/microcapsules$_{solid}$) and subsequently the evaporation rate was determined.

We claim:
1. A microcapsule comprising a capsule core and a capsule wall, wherein the capsule wall is formed from at least one polymer comprising:
   (A) 60% to 90% by weight of one or more $C_1$-$C_{24}$-alkyl esters of acrylic and/or methacrylic acid, acrylic acid, and/or methacrylic acid and/or maleic acid, as monomer I,
   (B) 10% to 40% by weight of a mixture of divinyl and polyvinyl monomers, as monomer II, wherein the divinyl monomer is at least one diester of a diol with acrylic acid and/or methacrylic acid and the polyvinyl monomer is at least one polyester of a polyol with a acrylic acid and/or methacrylic acid, wherein a fraction of the polyvinyl monomers is in the range from 2% to 90% by weight based on the monomers II, and
   (C) 0% to 30% by weight of one or more additional monomers other than monomers I and II, as monomer III,
   wherein the weight percent of (A), (B), and (C) is based on the total weight of the monomers, and
   wherein the capsule core comprises a lipophilic substance having a solid/liquid phase transition in the temperature range from 0 to 60° C. and which is a saturated or unsaturated $C_{10}$-$C_{40}$ aliphatic hydrocarbon.

2. The microcapsule according to claim 1, wherein the polyvinyl monomer is at least one monomer selected from the group consisting of trimethylolpropane triacrylate, trimethylolpropane trimethacrylate, pentaerythritol triallyl ether, pentaerythritol tetraallyl ether, pentaerythritol triacrylate, and pentaerythritol tetraacrylate.

3. The microcapsule according to claim 1, wherein additionally polyelectrolytes having an average molecular weight in the range from 500 g/mol to 10 million g/mol are disposed on the outer surface of the capsule wall.

4. The microcapsule according to claim 3, wherein the polyelectrolyte quantity is in the range from 0.1% to 10% by weight based on the total weight of the polyelectrolyte-bearing microcapsules.

5. The microcapsule according to claim 1, wherein the content of the monomers I is from 60 to 80% by weight and the content of the monomers II is from 20 to 40% by weight.

6. The microcapsule according to claim 1, wherein the divinyl monomer is butanediol diacrylate.

7. The microcapsule according to claim 6, wherein the polyvinyl monomer is pentaerythritol tetraacrylate.

8. The microcapsule according to claim 1, wherein the fraction of the polyvinyl monomer is in the range from 5 to 80% by weight based on the monomers II.

9. The microcapsule according to claim 1, wherein the polyvinyl monomer is pentaerythritol tetraacrylate.

10. Microcapsules comprising a capsule core and a capsule wall, wherein the capsule wall is formed from at least one polymer comprising:
    (A) 60% to 90% by weight of one or more $C_1$-$C_{24}$-alkyl esters of acrylic and/or methacrylic acid, acrylic acid, and/or methacrylic acid and/or maleic acid, as monomer I,
    (B) 10% to 40% by weight of a mixture of divinyl and polyvinyl monomers, as monomer II, wherein the divinyl monomer is at least one diester of a diol with acrylic acid and/or methacrylic acid and the polyvinyl monomer is at least one polyester of a polyol with a acrylic acid and/or methacrylic acid, wherein a fraction of the polyvinyl monomers is in the range from 2% to 90% by weight based on the monomers II, and
    (C) 0% to 30% by weight of one or more additional monomers other than monomers I and II, as monomer III,
    wherein the weight percent of (A), (B), and (C) is based on the total weight of the monomers, and
    wherein the microcapsules have an average particle size of 1.5-2.5 μm and 90% of the particles have a particle size≦4 μm, and
    wherein the capsule core comprises a lipophilic substance having a solid/liquid phase transition in the temperature range from 0 to 60° C. and which is a saturated or unsaturated $C_{10}$-$C_{40}$ aliphatic hydrocarbon.

11. The microcapsules according to claim 10, wherein the fraction of the polyvinyl monomers is in the range from 5% to 80% by weight based on the sum total of divinyl and polyvinyl monomers.

12. The microcapsules according to claim 10 which is in the form of an aqueous dispersion.

13. A process for producing microcapsules according to claim 10, wherein each microcapsule comprises a capsule core and a capsule wall, wherein the capsule wall is formed from at least one polymer comprising:
    (A) 60% to 90% by weight of one or more $C_1$-$C_{24}$-alkyl esters of acrylic and/or methacrylic acid, acrylic acid, and/or methacrylic acid and/or maleic acid, as monomer I,
    (B) 10% to 40% by weight of a mixture of divinyl and polyvinyl monomers, as monomer II, wherein the divinyl monomer is at least one diester of a diol with acrylic acid and/or methacrylic acid and the polyvinyl monomer is at least one polyester of a polyol with a acrylic acid and/or methacrylic acid, wherein a fraction of the polyvinyl monomers is in the range from 2% to 90% by weight based on the monomers II, and
    (C) 0% to 30% by weight of one or more additional monomers other than monomers I and II, as monomer III,
    wherein the weight percent of (A), (B), and (C) is based on the total weight of the monomers,
    said process comprising heating an oil-in-water emulsion in which the monomers, a free-radical initiator and the lipophilic substance are present as a disperse phase.

14. The process for producing microcapsules according to claim 13, further comprising:
    a) producing an oil-in-water emulsion comprising the monomers, the lipophilic substance and polyvinyl alcohol and/or partially hydrolyzed polyvinyl acetate, wherein an average size of oil droplets is 1.5-2.5 μm, and
    b) free-radically polymerizing the monomers of the oil-in-water emulsion obtained by a).

15. The process for producing microcapsules according to claim 13, further comprising contacting a microcapsular dispersion with one or more polyelectrolytes.

16. A method of manufacturing textiles comprising incorporating the microcapsules according to claim 10 in the textiles.

17. A method of manufacturing building materials comprising incorporating the microcapsules according to claim 10 in the building materials.

18. A method of producing heat transfer fluids comprising incorporating the microcapsules according to claim 10 in the heat transfer fluids.

19. The microcapsules according to claim 10, wherein 90% of the particles have a particle size≦3.5 μm.

20. The microcapsules according to claim 10, wherein 90% of the particles have a particle size≦3 μm.

* * * * *